United States Patent [19]

Hara et al.

[11] 4,050,390
[45] Sept. 27, 1977

[54] METHOD OF TREATING SEWAGE SLUDGE

[75] Inventors: Shinichi Hara, Handa; Taro Kato, Nagoya, both of Japan

[73] Assignee: NGK Insulators, Ltd., Nagoya, Japan

[21] Appl. No.: 718,559

[22] Filed: Aug. 30, 1976

[30] Foreign Application Priority Data

Sept. 18, 1975 Japan .................................. 50-112064

[51] Int. Cl.² .............................................. F23G 5/12
[52] U.S. Cl. ...................................... 110/15; 110/8 A; 110/12; 110/119
[58] Field of Search ................ 110/8 R, 8 A, 8 C, 11, 110/12, 15, 18 R, 18 C, 119

[56] References Cited

U.S. PATENT DOCUMENTS

| 3,344,758 | 10/1967 | Wotschke | 110/18 |
| 3,697,256 | 10/1972 | Engle | 110/15 |
| 3,707,129 | 12/1972 | Kawashimo et al. | 110/15 |
| 3,771,468 | 11/1973 | Kelly | 110/11 |
| 3,772,998 | 11/1973 | Menigat | 110/15 |

Primary Examiner—Kenneth W. Sprague
Attorney, Agent, or Firm—Stevens, Davis, Miller & Mosher

[57] ABSTRACT

A method of treating sewage sludge is disclosed. The method makes use of an unitary multi-hearth furnace and the sewage sludge is dried in an upper part of the furnace and subjected to pyrolyzation in a lower part thereof to cause the sewage sludge to be reduced to ashes whereby a relatively small amount of exhaust gas is produced. The exhaust gas is also utilized as a heat supply source.

2 Claims, 3 Drawing Figures

METHOD OF TREATING SEWAGE SLUDGE

BACKGROUND OF THE INVENTION

1. Field of the Invention

This invention relates to a method of treating sewage sludge and more particularly to a method of pyrolyzing sewage sludge, which requires less installation and maintenance costs and which can treat the sewage sludge without any risk of involving subsidiary environmental pollution.

2. Description of the Prior Art

An incineration method has heretofore been widely used as the most general method of treating sewage sludge produced from sewage purification plants.

That is, as shown in FIG. 1, a sludge cake 1, which is dehydrated up to 65 to 85% of moisture, is fed into the uppermost stage of a multi-hearth incinerator 2. For example, the amount of heat required for drying and incineration is generated in a combustion chamber 3 and is fed as a high temperature hot gas through a duct 4 into the lower part of the multi-hearth incinerator 2. The sludge 1 is completely burned to ashes at the lower stage of the multi-hearth incinerator 2 and the ashes 5 are extracted downwardly therefrom.

The combustion gas of the sludge rises in the multi-hearth incinerator 2 and is directly brought into contact with the dehydrated sludge to dry it and then exhausted from the uppermost part of the multi-hearth incinerator 2 as exhaust gas.

This exhaust gas, however, emits a strong offensive odor, so that if the exhaust gas is directly discharged into atmospheric air, the strong offensive odor thereof causes subsidiary environmental pollution. In order to eliminate such disadvantages, the exhaust gas is subjected to a deodorizing treatment. For this, purpose, the exhaust gas is fed through a preheater 8 to an after-burner 6 by which the exhaust gas is heated at a temperature of 750° to 800° C and then fed through the preheater 8 to an exhaust gas treating installation 7 which can effect cooling, dust removing, desulfurization etc. and subsequently the exhaust gas is discharged into atmospheric air.

Such a conventional method of treating sewage sludge by the incineration requires a large amount of combustion air for completely burning the sewage sludge to ashes, which is several times larger than the theoretical amount. As a result, it is inevitable that a large amount of exhaust gas is generated. Generation of such a large amount of exhaust gas has a number of disadvantages. In the first place, the exhaust gas treating installation 7 becomes so large in size and complex in construction as to excessively increase the installation cost and the maintenance cost. Secondly, a large amounts of fuel are required to effect after-burning for the deodorizing treatment, thereby increasing both the installation cost and the maintenance cost. Finally, in the case of incinerating a chromium compound containing sewage sludge, hexavalent chromium injurious to the human body is produced and remains in burned ashes whereby the burned ashes must be subjected to after treatment for the purpose of preventing environmental pollution.

SUMMARY OF THE INVENTION

A principal object of the invention, therefore, is to provide a method of treating sewage sludge whereby exhaust gas can be treated in a simple manner.

Another object of the invention is to provide a method of treating sewage sludge whereby a very small amount of exhaust gas is produced.

A further object of the invention is to provide a method of treating sewage sludge whereby environmental pollution can effectively be prevented.

A still further object of the invention is to provide a method of treating sewage sludge whereby a small amount of fuel is required.

Another object of the invention is to provide a novel method of the kind above referred to whereby the above mentioned various objects can be attained by modifying existing unitary multi-hearth furnace.

BRIEF DESCRIPTION OF THE DRAWINGS

In FIGS. 1 and 2, a gas stream is shown by a full line arrow, an air stream is shown by a broken line arrow and a sewage sludge is moved along with a double full line arrow.

DETAILED DESCRIPTION OF THE INVENTION

Figure 1:
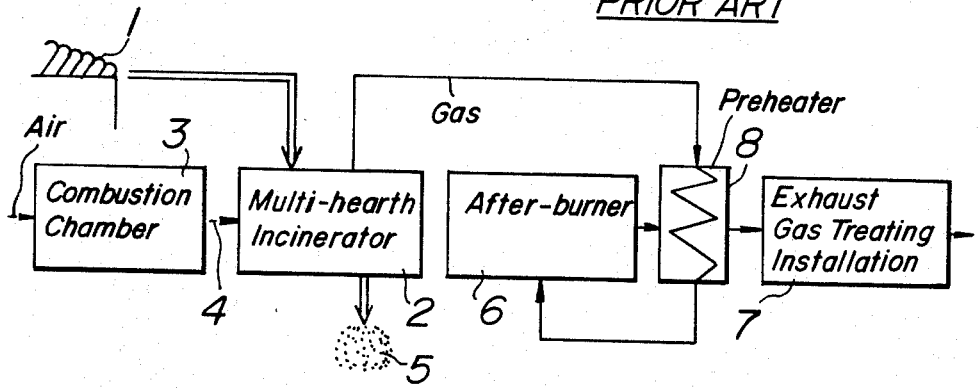
FIG. 1 is a diagrammatic representation of steps of the prior art method of treating sewage sludge with the aid of the incineration method.

The invention will now be described in greater detail with reference to FIG. 2.

A cake-shaped sewage sludge 1 obtained by dehydrating municipal or organic waste water from industrical works is fed through a screw conveyor 9 etc. to an upper stage 13 of a multi-hearth furnace 10 and exposed to hot air fed through a duct 12 from a hot gas generating furnace 11. The sludge 1 is dried to such an extent that its average water content becomes on the order of 20 to 30% in the drying zone 13 in the upper part of the multi-hearth furnace 10 and then is dropped downwardly in succession to the lower part of the multi-hearth furnace 10. The sludge is exposed to the hot gas fed through a duct 14 from the hot gas generating furance 11 and subjected to pyrolyzation at a temperature of 700° and 900° C in a reducing atmosphere in a pyrolyzing zone 15 at the lower part of the multi-hearth furnace 10.

Exhaust gas with offensive odor and water vapor delivered from the upper drying zone 13 of the multi-hearth furnace 10 is fed to a dehumidifying tower 16. The exhaust gas dehumidified in the dehumidifying tower 16 is mixed with a combustible exhaust gas delivered from the lower pyrolyzing zone 15 of the multi-hearth furnace 10. The mixed gas is then fed through an exhaust gas preheater 18 to an after-burner 17 and subjected to burning treatment.

Hot deodorized combustion exhaust gas delivered from the after-burner 17 is fed through the preheater 18 and an air preheater 18' provided adjacent to the exhaust gas preheater 18 to an exhaust gas treating installation 7 from which it is discharged into atmospheric air. As a result, the hot deodorized combustion exhaust gas delivered from the after-burner 17 serves as a heat supply source for preheating not only the exhaust gas fed into the preheater 18 and consisting of the exhaust gas delivered from the dehumidifying tower 16 and the exhaust gas delivered from the pyrolyzing zone 15 of the multi-hearth furnace 19, but also the air fed into the preheater 18'.

In addition, a part of the deodorized exhaust gas delivered from the after-burner 16 and a part of the air delivered from the preheater 18' are fed into and heated in the hot gas generating furnace 11 from which they are fed into the drying zone 13 and the pyrolyzing zone 15 of the multi-hearth furnace 10 as heat supply sources thereof.

Figure 3:
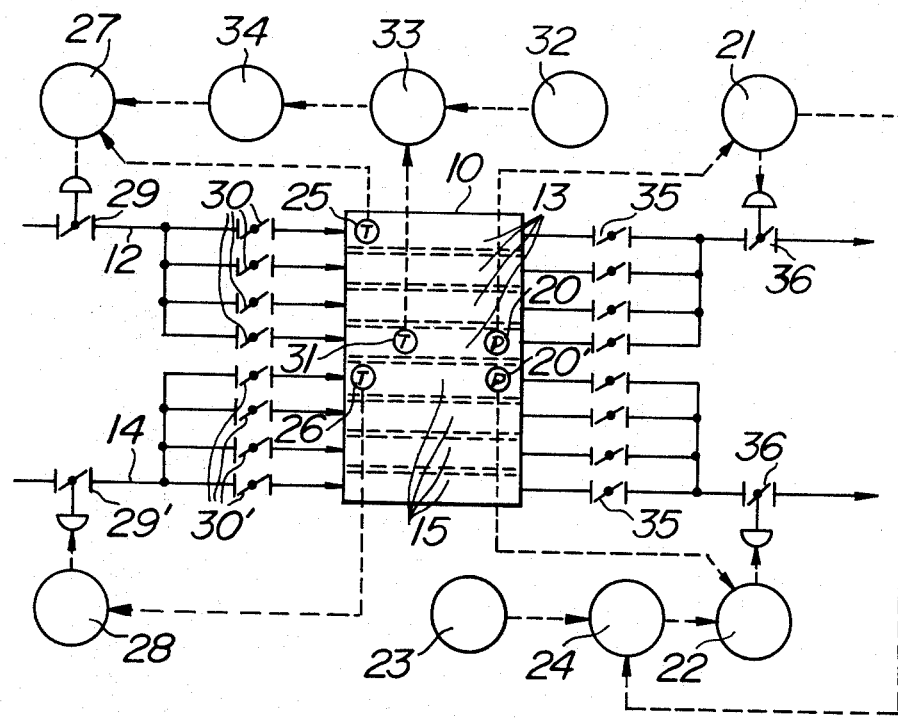
FIG. 3 is a diagrammatic representation of a drying zone and a pyrolyzing zone of the multi-hearth furnace shown in FIG. 2.
Figure 2:
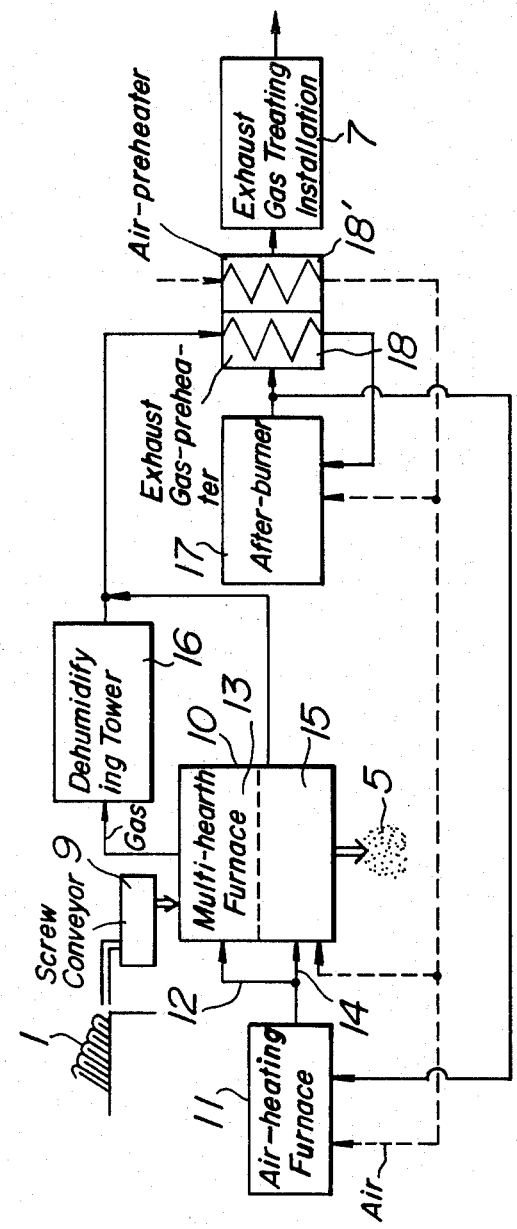
FIG. 2 is a diagrammatic representation of a method of treating sewage sludge according to the invention.

In FIG. 3 is shown in detail the multi-hearth furnace 10 shown in FIG. 2 consisting of, for example, 8 stages, the upper 4 stages of which constituting the drying zone 13 and the lower 4 stages constituting the dry pyrolyzing zone 15.

In order to control the temperature in the multi-hearth furnace 10, the temperature in the drying zone 13 is detected by means of a temperature detecting terminal 25 provided at the first stage of the drying zone 13 and for delivering an electric signal, while the temperature in the pyrolyzing zone 15 is detected by means of a temperature detecting terminal 26 provided at the first stage of the pyrolyzing zone 15 and for delivering an electric signal. These electric signals are transferred through conductors to temperature adjusting devices 27, 28 which can control hot gas adjusting dampers 29, 29' provided on the ducts 12, 14, respectively. Each of the ducts 12, 14 is connected to four branches communicated with the four stages of the drying zone 13 and the four stages of the pyrolyzing zone 15, respectively.

Each of these branches is provided with a hot gas adjusting damper 30, 30'.

If the temperature of the drying zone 13, particularly the fourth stage thereof becomes higher than a given temperature of the drying zone 13, there is a risk of the drying zone 13 being subjected to the pyrolysis. In order to obviate such danger, the temperature of the fourth stage of the drying zone 13 is detected by means of a temperature detecting terminal 31 which can produce an electric signal in response to the temperature detected. This electric signal is supplied to a signal addition and subtraction device 33 which can compare this electric signal with a signal representing a standard temperature delivered from a signal generator 32 to produce a deviation signal. This deviation signal is supplied through a magnification adjusting device 34 to the temperature adjusting device 27 which can control the hot gas adjusting damper 29. Thus, it is possible to automatically control the temperature of the drying zone 13 to that value which can prevent occurrence of the pyrolysis in the drying zone 13.

In order to prevent the exhaust gas produced at the drying zone from being mixed with the exhaust gas produced at the pyrolyzing zone, it is important to extract small amounts from the lowermost stage of the drying zone 13 and from the uppermost stage of the pyrolyzing zone 13 and detect these pressures in the lowermost stage of the drying zone 13 and the uppermost stage of the pyrolyzing zone 15 by means of pressure detection terminals 20, 20' provided in these stages and control these pressures by pressure adjusting devices 21, 22 such that the pressure in the lowermost stage of the dry zone 13 is substantially equal to or higher than the pressure in the uppermost stage of the pyrolyzing zone 15 by several mmHg.

In order to operate the multi-hearth furnace 10 in an easy manner, it is preferable to set a difference between the pressures in the lowermost stage of the drying zone 13 and the uppermost stage of the pyrolyzing zone 15 to any value by means of a signal generator 23 for generating a signal representing a standard pressure and a signal addition and subtraction device 24. This control of the pressure in the multi-hearth furnace 10 may be performed in the same manner as the above described control of the temperature therein.

In the multi-hearth furnace 10 including 8 stages shown in FIG. 3, a ratio of the amount of hot gas to be fed into each stage to the amount of exhaust gas to be extracted from each stage can be set to any value by means of dampers 30, 30' provided for each stage and adjusting the amount of hot gas to be fed and dampers 35, 36 provided for each stage and adjusting the amount of exhaust gas to be extracted. For example, let a ratio of the amount of hot gas to be fed into the first, second, third and fourth stages of the drying zone 13 to the amount of exhaust gas to be extracted from these stages be 2:3:2:1 and let a ratio of the amount of hot gas to be fed to the fifth, sixth, seventh and eighth stages of the pyrolyzing zone 15 to the amount of exhaust gas to be extracted from these stages be 1:3:2:2, the pressure in the fourth stage of the drying zone 13 becomes substantially equal to the pressure in the uppermost stage of the pyrolyzing zone 13 (the fifth stage), while the temperature in the former stage becomes relatively similar to the temperature in the latter stage. As a result, both the drying and the pyrolyzing can simultaneously be effected independently of each other in the unitary multi-hearth furnaces.

As explained hereinbefore, the method of treating sewage sludge according to the invention has a number of advantages. In the first place, it is capable of pyrolyzing sewage sludge without producing hexavalent chromium with the aid of an existing multi-hearth furnace. Secondly, the invention provides an economical way of preheating and burning both the exhaust gas delivered from the drying zone of the multi-hearth furnace and dehumidified and the exhaust gas delivered from the pyrolyzing zone of the furnace and hence there is no risk of an offensive odor being emitted. Third, the combustible gas such as $CH_4$, $H_2$, $C_2H_6$ etc. delivered from the pyrolyzing zone of the furnace can be used again as an auxiliary fuel in the drying step and the pyrolyzing step, so that it is possible to significantly reduce the maintenance cost and contribute greatly in heat economy. Finally, the method according to the invention can be applied effectively to the pyrolysis treatment of sewage sludge produced from sewage purification plants.

What is claimed is:
1. A method of treating sewage sludge comprising
   drying sewage sludge in an upper part of a multi-hearth furnace,
   subjecting the sewage sludge to pyrolyzation in a lower part thereof to cause it to reduce to ashes,
   extracting from the multi-hearth furnace both exhaust gas produced during the drying of the sewage sludge and the exhaust gas produced during the pyrolyzing independent of each other,
   dehumidifying the exhaust gas produced during the drying of the sewage sludge, mixing the exhaust gas thus dehumidified with the exhaust gas produced during the pyrolyzing of the sewage sludge, adding preheated gas to the mixed exhaust gas and burning the preheated mixed gas in an after-burner and discharging the combustion gas into atmospheric air, heat generated in the after-burner being used again to preheat gas to be fed into the after-burner and to an air-heating furnace and preheat the exhaust gas to be fed into the after-burner and a part of the exhaust gas burned in the after-burner together with the preheated air being heated in the air-heating furnace and then fed into the multi-hearth furnace.

2. A method according to claim 1, wherein, the exhaust gas is subjected to cooling, dust removing, and desulfurization and then discharged into atmospheric air.

* * * * *